May 29, 1962 C. W. BURNHAM 3,036,337
INJECTION MOLDING MACHINE WITH CUSHIONING DEVICE
Filed Nov. 13, 1959 2 Sheets-Sheet 2

INVENTOR.
CLARENCE W. BURNHAM
BY
HIS ATTORNEY

United States Patent Office 3,036,337
Patented May 29, 1962

3,036,337
INJECTION MOLDING MACHINE WITH CUSHIONING DEVICE
Clarence W. Burnham, Springfield, Vt., assignor to The Fellows Gear Shaper Company, Springfield, Vt., a corporation of Vermont
Filed Nov. 13, 1959, Ser. No. 852,687
3 Claims. (Cl. 18—30)

The present invention relates to injection molding machines and more particularly to the type of plastic injection molding machine in which two die plates or platens are mounted axially parallel to each other with one being slidably mounted so it may be brought into a clamping position with the stationary platen.

The clamping position is usually held between the two platens while a nozzle injects a given amount of molten plastic into the die cavity formed by the halves of a mold held on the two platens of an injection molding machine.

In injection molding machines of the type involved herein the opening and closing of the die plates or platens and the method of doing such is of paramount importance since speed and quietness are essential and the platens are usually heavy and travel at high speeds.

Therefore the principal object of the present invention is to provide a means for opening and closing the platens or as they are sometimes called the die plates in a smooth and efficient manner.

Another object of the present invention is to provide a means for opening and closing a pair of platens in an injection molding machine in a cushioned manner to prevent abrupt starting and stopping.

A further object of the present invention is to provide a means which will cushion a reciprocating platen to lessen the customary wear on the machine caused by abrupt starting and stopping.

A further object of the present invention is to provide a device for decelerating the speed of a returning platen in a manner smoother than has heretofore been possible.

A further object of the present invention is to provide a terminal cushion for a returning platen or die plate which can be used equally as well for the advancing stroke of the die plate to advance its start in a like cushioned manner to avoid any abrupt stopping or starting.

A further object of the present invention is to provide a terminal cushion which functions properly without the aid of any auxiliary check valve.

A further object of the present invention is to provide a device having a specific terminal cushion which effects an acceleration speed equal to the decelerating speed.

A still further object of the present invention is to provide an injection molding machine having a terminal cushion which serves as an auxiliary starter and stopper during the advancement and retraction of the platen.

Like reference characters designate the same parts wherever they occur.

Figure 2:
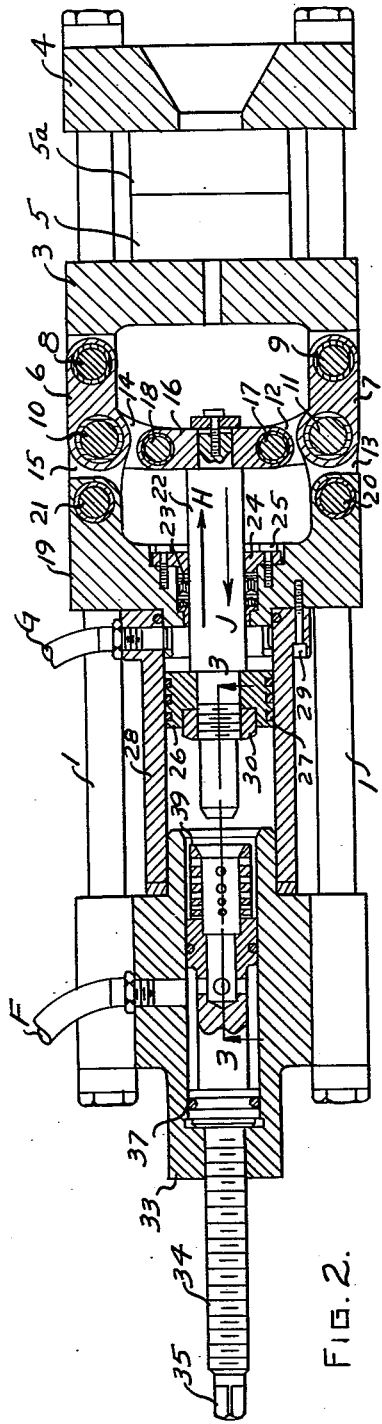
FIGURE 2 is a sectional view taken along lines 2—2 of FIGURE 1 showing the mechanism concerned in the present invention which opens and closes the die plates or platens.
Figure 3:
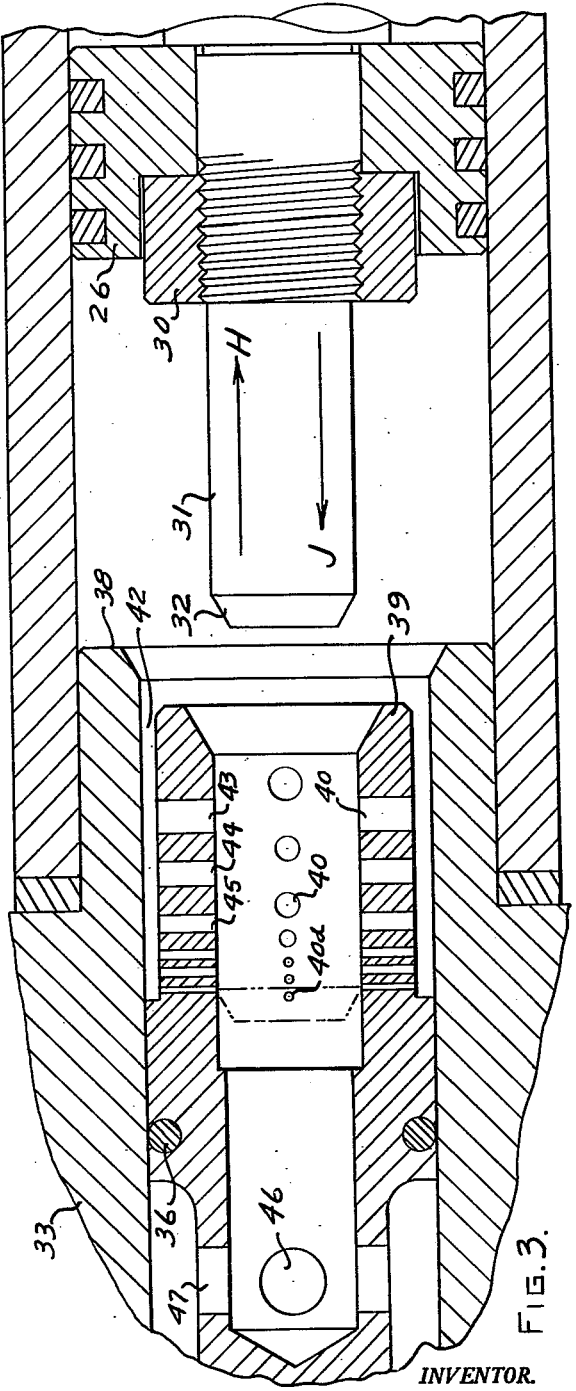

FIGURE 3 is an enlarged view taken along lines 3—3 of FIGURE 2 showing the adjustment screw forward portion 39 and the openings 40 in relation to piston rod extension 31.

Figure 1:
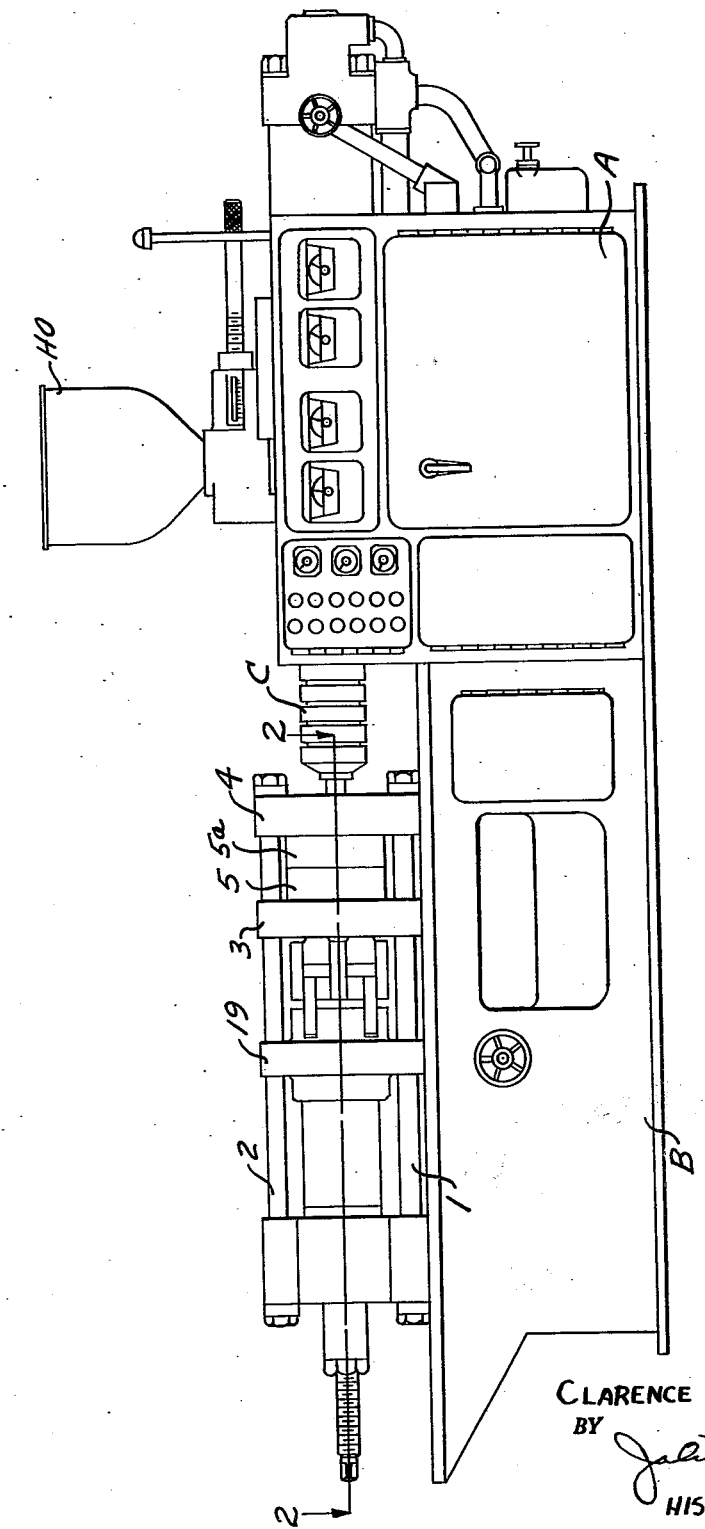
FIGURE 1 is a front view of an injection molding machine of the type embodying the present invention.

The machine A in FIGURE 1 is an ordinary plastic injection molding machine with a base B, hopper HO and having the usual electrical and hydraulic features with the injection nozzle being located generally at C.

Lower guide rods 1 and upper guide rods 2 support or carry platens or die plates 3 and 4.

Platen 4 in this particular case is shown as a fixed platen, and is secured permanently in the position as shown to four guide rods such as 1 and 2.

Platen or die plate 3 is mounted slidably on the guide rods referred to. As can be readily understood, platen 3 is slidably movable to a forward position until mold halves 5 and 5A mounted respectively on platens 3 and 4 close. When mold halves 5 and 5A are closed a complete die unit is formed with an internal mold cavity. When the internal mold cavity so formed is filled with plastic material and the time interval has passed which is necessary for the article being molded to become solidified reversed motion is imparted to platen 3 thereby separating the mold halves 5 and 5A. As this occurs platen 3 is retracted along guide rods 1 and 2 from its forward position such as is shown in FIGURE 2.

The fact that platen 4 is stationary and platen 3 movable does not limit the present invention to the scope shown in the accompanying drawings since many varied combinations of platen movement and adjustment may be used. It is to be understood however that the particular platen disposition and movement as shown herein is for illustrative purposes only.

A toggle linkage mechanism such as is well known in the art is shown herein for moving platen 3. The toggle linkage consists of two link arms 6 and 7 (FIGURE 2) which are pivoted to slidable platen 3 on pivot pins 8 and 9. The two link arms 6 and 7 have rear pivot pins 10 and 11 each of which has rotatably mounted thereon two short cross links, pin 11 having cross links 12 and 13 and pin 10 having cross links 14 and 15. Cross links 12 and 14 are pivoted to a tie link 16 respectively by pivot pins 17 and 18.

Cross links 13 and 15 are pivoted to a piston rod supporting member 19 by respective pivot pins 20 and 21. Piston rod supporting member 19 supports a slidable piston rod 22. Member 19 is held in a fixed position relative to the tie rods and base B.

Piston rod 22 reciprocates in the direction of arrows J and H and is held slidably in supporting member 19 by bearing plate 24.

Packings 23 are held firmly in place by bearing plate 24 which is secured to piston supporting member 19 by a series of bolts 25.

Piston 26 contains piston rings which are indicated at 27. These piston rings enable piston 26 to slide freely in cylinder 28. Cylinder 28 is held secure to piston rod supporting member 19 by a series of bolts 29.

Piston 26 is held securely in place against a shoulder portion of piston rod 22 by means of a nut 30.

Piston rod extension 31 protrudes rearwardly from piston 26, and has a conical diverging face indicated at 32 which allows a free entrance into adjustment screw forward portion 39.

Rearwardly of the cylinder 28 is an adjustment screw housing member 33 with adjustment screw 34 mounted therein.

Protruding beyond the exterior of the machine is a nut portion 35 of adjustment screw 34. Any mechanical or manual means may be employed to rotate the adjustment screw 34 in order to alter the axial position of adjustment screw forward portion 39.

The position of adjustment screw forward portion 39 determines the axial rearward limit of movement of platen 3.

The advancement or retraction of forward portion 39 of adjustment screw 34 within adjustment screw housing member 33 allows a shorter or longer stroke of piston rod extension 31.

As can be readily seen this shortens or lengthens the working stroke of piston 26, piston rod 22, and rear platen 3.

Therefore any axial change in the location of adjustment screw 34 indirectly alters the rearward working location of platen 3 or guide rods 1 and 2 relative to its distance from platen 4.

The distance between platens 3 and 4 must be altered from time to time for the purpose of replacing mold halves 5 and 5A with mold halves of varied thickness.

For example, in molding pocket combs die plates of lesser thickness would be required than die plates that would be used to mold a thicker article such as a lamp shade.

Adjustment screw 34 is rotatably mounted and sealed by O-rings against leakage on both sides as indicated by 36 and 37.

The forward portion of adjustment screw housing member 33 consists of a leading face portion indicated at 38.

Leading face 38 acts as an abutting member when piston 26 moves rearward and the rear portion of piston 26 abuts against leading face 38 and in this manner a fixed limit is provided for the rearward movement of piston 26 and accordingly platen 3.

Adjustment screw 34 contains the hollow forward portion 39 which has an inside diameter complemental to the outside diameter of piston rod extension 31.

A series of radially disposed openings 40 are formed through the annulus of forward portion 39. These openings 40 as seen in FIGURES 2 and 3 gradually decrease in size rearwardly. This size variation of openings 40 may be altered as desired to acquire any particular curve of deceleration or acceleration.

It may be pointed out at this time that any curve of deceleration caused by any particular sequence of opening sizes will cause a like curve of acceleration on a return stroke.

It may also be pointed out here that any mechanical or hydraulic means may be employed to close some or all of the openings 40 in order to alter a deceleration curve or an acceleration curve on either the return stroke or the forward stroke in order to cushion a return stroke or accelerate a forward stroke.

It can readily be seen that when pressure of any suitable fluid is applied to either the ports G or F piston 26 will move in either of directions J or H.

For example as fluid is admitted to port G the piston 26 and accordingly platen 3 will move to the left or rearwardly at its maximum rate of speed until such time as piston rod extension 31 enters the complemental opening in portion 39. At such time the fluid from cylinder 28 must flow to exhaust port F through the annular space 42 lying between housing member 33 and portion 39 to openings 40 then to ports 46 and 47 to port F. Due to the reduction in the size of openings 40 it will be apparent that the flow of fluid from cylinder 28 to port F will be gradually restricted causing a deceleration of the speed of movement of piston 26 and accordingly that of platen 3.

The openings 40 are so arranged that the most rearwardly disposed opening designated as 40d is never wholly closed off by extension 31. This permits fluid to flow from port F to port G when it is desired to move piston 26 to the right as seen in FIGURES 2 and 3 and accordingly move platen 3 to the right so as to close the mold halves 5 and 5A.

On movement to the right of piston 26 and platen 3 due to the increase in size of openings 40 an acceleration will be obtained which is in the opposite to that of the deceleration obtained upon movement of piston 26 to the left.

From the above it will be clear that when pressure is applied to port G, port F must be open to exhaust in order for piston 26 and piston rod 22 and piston rod extension 31 to travel at maximum speed until piston rod extension 31 enters the hollow forward portion 39 of adjustment screw 34. At this point the action of deceleration becomes effective. Then the fluid in cylinder 28 is flowing into the annular space 42 and through the gradually diminishing sized openings 40 designated as 43, 44 and 45 in forward portion 39 of adjustment screw 34. As piston rod extension 31 penetrates deeper into hollow portion 39 the speed of the platen 3 is decelerated according to the pattern of openings in adjustment screw forward portion 39, thus the deceleration increases as the pressure fluid flows more slowly due to the progressively small sized openings being the only ones left open. This action slows the return stroke of platen 3 to cushion its progressive travel to a gradual stop. As the fluid flows through the gradually diminishing openings in the forward portion 39 which surrounds piston rod extension 31 it progresses in a rearward direction through adjustment screw 34 and passes out ports 46 and 47 into port F to exhaust.

Since the last opening 40d is never closed off when the piston 26 comes to a stop against leading face 38 the present apparatus operates without the use of a check valve.

In some cases the leading face 38 need not serve as the stop to limit movement of piston 26 to the left or rearwardly. This will occur when adjustment screw 34 has been positioned so that forward portion 39 extends further to the right or forwardly of the leading face 38. When this occurs the forward portion 39 will be contacted by the nut 30 and will therefore serve as the limit stop to rearward motion of the piston 26. In case either the leading face 38 or the forward portion 39 serves as a stop the use of any check valve or valves is eliminated to insure the proper reciprocating motion of piston 26 and accordingly platen 3.

When the platen 3 is to be moved forwardly or to the right as seen in FIGURES 1 and 2 fluid is admitted to port F and port G becomes the exhaust port through the use of suitable hydraulic controls as is well known in the art. When port F becomes the entrance port fluid flows from port F through ports 47 and 46, through the adjustment screw to open port 40d to end of piston 26. The piston 26 will then begin its movement to the right or forwardly thus causing a similar movement of platen 3.

As the piston rod extension 31 is withdrawn from forward portion 39 the openings 40 will gradually be opened causing a greater amount of fluid to enter cylinder 28 due to the greater number of openings becoming operable and also because of the gradually increasing size of the same openings.

Many alternate modes of operation or mechanical construction may be obtained to achieve the result attained herein particularly so in the construction of the openings 40 in adjustment screw forward portion 39 considering also that like openings may be formed in piston rod extension 31.

What I claim and desire to secure by Letters Patent is:

1. In an injection molding machine, a base, a first platen fixed to said base, a second platen slidably mounted on said base, means to reciprocate said second platen with respect to said first platen, said reciprocating means consisting of a toggle having one end thereof fixed to said base and the other end fixed to said second platen, means to actuate said toggle including a cylinder, a piston reciprocable in said cylinder, a piston rod connecting said piston to said toggle, a piston rod extension extending rearwardly from said piston, a member having on opening therein adapted to receive said piston rod extension and said member having a means formed therein cooperating with said piston rod extension so constructed and arranged as to vary the speed of movement of said piston and accordingly said second platen, said last named means including a plurality of openings formed in said last named member, said openings being of variable sizes and said piston rod extension being operable to open and close said openings to vary the rate of flow of fluid to or from said cylinder.

2. In an injection molding machine of the character described, a base, a first platen fixed to said base, a second platen reciprocably mounted on said base for movement towards and away from said first platen, means to reciprocate said second platen, said reciprocating means including a cylinder fixed to said base, a piston in said cylinder, means connecting said piston to said second platen, a piston rod extension fixed to said piston, a housing member fixed to said base, an adjusting screw mounted in said housing, said adjusting screw having a hollow forward portion formed thereon complemental to said piston rod extension, said forward portion having a plurality of openings of variable sizes formed thereon, means to reciprocate piston so as to advance and retract said piston rod extension from engagement with said hollow forward portion whereby said openings are opened and closed to vary the rate of movement of said piston and said second platen by varying the flow of fluid to and from said cylinder.

3. In an injection molding machine, a base, a first platen fixed to said base, a second platen reciprocably mounted on said base with respect to said first-mentioned platen, a cylinder fixed to said base, a piston reciprocable in said cylinder, a piston rod on one side of said piston connecting said piston to said second platen, a piston rod extension on the other side of said piston, a housing member mounted on said base adjacent to said piston rod extension, said housing member being a hollow forward portion positioned therein having an internal configuration complemental to said piston rod extension, means to advance said piston rod extension within said hollow forward portion and means coacting between said hollow forward portion and said piston rod extension whereby the rate of movement of said piston is varied, said last mentioned means including a plurality of openings formed in said forward portion, said openings being of varying size so as to change the rate of flow of fluid to and from said cylinder.

References Cited in the file of this patent

UNITED STATES PATENTS

| | | |
|---|---|---|
| 2,246,461 | Cannon | June 17, 1941 |
| 2,436,122 | Rotsler | Feb. 17, 1948 |
| 2,453,058 | Ashbaugh | Nov. 2, 1948 |
| 2,498,264 | Goldhard | Feb. 21, 1950 |
| 2,501,329 | Hall | Mar. 21, 1950 |
| 2,718,662 | Bohannon et al. | Sept. 27, 1955 |
| 2,780,836 | Morin | Feb. 12, 1957 |
| 2,897,791 | Routledge | Aug. 4, 1959 |
| 2,914,971 | Kendall et al. | Dec. 1, 1959 |